(12) United States Patent
Hsieh et al.

(10) Patent No.: US 8,445,565 B2
(45) Date of Patent: May 21, 2013

(54) FLAME RETARDANT AGENTS AND FLAME RETARDANT MATERIALS COMPRISING THE SAME

(75) Inventors: Cheng-Han Hsieh, Changhua (TW); Yung-Chan Lin, Luzhou (TW); En-Nan Liu, Kaohsiung (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 13/233,521

(22) Filed: Sep. 15, 2011

(65) Prior Publication Data
US 2012/0277349 A1 Nov. 1, 2012

(30) Foreign Application Priority Data
Apr. 26, 2011 (TW) .............................. 100114395 A

(51) Int. Cl.
*C08H 7/00* (2011.01)
*C08L 79/02* (2006.01)

(52) U.S. Cl.
USPC ............................................. 524/73; 530/501

(58) Field of Classification Search
USPC ...................................... 524/72, 73; 530/501
See application file for complete search history.

(56) References Cited

U.S. PATENT DOCUMENTS

| | | |
|---|---|---|
| 3,149,085 A | 9/1964 | Ball et al. |
| 4,130,515 A | 12/1978 | Bornstein |
| 4,857,638 A | 8/1989 | Yalpani et al. |
| 5,071,682 A | 12/1991 | Moore |
| 6,270,694 B1 | 8/2001 | Blount |
| 6,495,655 B2 | 12/2002 | Blount |
| 2006/0122310 A1* | 6/2006 | Matthijssen .................. 524/445 |
| 2007/0185287 A1* | 8/2007 | Itagaki et al. ................. 525/524 |

FOREIGN PATENT DOCUMENTS

JP 02-022287 1/1990

OTHER PUBLICATIONS

Wu, Weidong et al., "Statistical Analysis of the Performance of the Flame Retardant Finishing System Consisting of a Hydroxy-Functional Organophosphorus Oligomer and the Mixture of DMDHEU and Melamine—Formaldehyde Resin", Polymer Degradation and Stability 85 (2004) 623-632.
Chirico, A. De, et al., "Flame Retardants for Polypropylene Based on Lignin", Polymer Degradation and Stability 79 (2003) 139-145.
Office Action dated Dec. 13, 2013 from corresponding application No. KR 10-2011-0098952 (with English Translation).

* cited by examiner

*Primary Examiner* — John Uselding
(74) *Attorney, Agent, or Firm* — Lowe Hauptman Ham & Berner, LLP

(57) ABSTRACT

Disclosed is a flame retardant agent, including a nitrogen-based lignin formed by reacting 1 part by weight of lignin, 0.8 to 2.4 parts by weight of a nitrogen-containing compound, and 0.3 to 0.9 parts by weight of an aldehyde under an alkaline condition. The flame retardant agent can be added to thermoplastic or thermosetting resins to form flame retardant materials.

14 Claims, 16 Drawing Sheets

FLAME RETARDANT AGENTS AND FLAME RETARDANT MATERIALS COMPRISING THE SAME

CROSS REFERENCE TO RELATED APPLICATIONS

This Application claims priority of Taiwan Patent Application No. 100114395, filed on Apr. 26, 2011, the entirety of which is incorporated by reference herein.

BACKGROUND OF THE INVENTION

1. Field of the Invention

The present invention relates to flame retardant materials, and in particular relates to flame retardant agents thereof.

2. Description of the Related Art

Flame retardant agents are important processing agents, and demand for flame retardant agents are less than that of plasticizers. Halogen-based flame retardant agents are banned in the European Union due to their production of toxic gases such as dioxin or furan when burnt. Phosphorous-based flame retardant agents are safer than that of halogen-based flame retardant agents. However, they often cause eutrophication of rivers and lakes. In addition, phosphorous-based flame retardant agents easily hydrolyze, thereby degrading the reliability of products. Endothermic inorganic flame retardant agents such as aluminum hydroxide or magnesium hydroxide are environmental friendly. However, their additive amounts must be high to achieve flame retardant effects. As such, the high additive amounts of the inorganic flame retardant agents may reduce mechanical properties of products, thereby limiting the application of products. Accordingly, a novel halogen-free, phosphorous-free, highly effective, minimal smoke, low toxic and low amount of additive flame retardant agent is called-for.

BRIEF SUMMARY OF THE INVENTION

One embodiment of the disclosure provides a flame retardant agent, comprising: a nitrogen-based lignin formed by reacting 1 part by weight of lignin, 0.8 to 2.4 parts by weight of a nitrogen-containing compound, and 0.3 to 0.9 parts by weight of an aldehyde under an alkaline condition.

One embodiment of the disclosure provides a flame retardant material, comprising the described flame retardant agent and a thermosetting resin, wherein the flame retardant agent and the thermosetting resin have a weight ratio of 1:10 to 1:1.

One embodiment of the disclosure provides a flame retardant material, comprising the described flame retardant agent and a thermoplastic resin, wherein the flame retardant agent and the thermoplastic resin have a weight ratio of 1:10 to 1:3.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
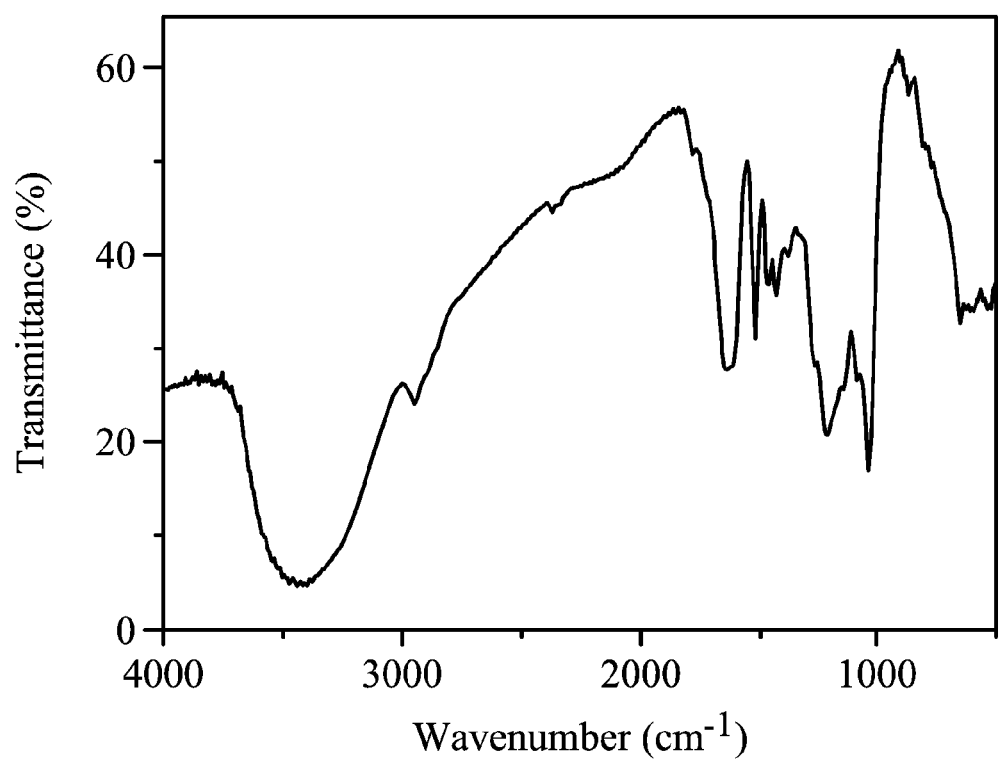
FIG. 1 shows an IR spectrum of a commercially available sodium lignosulfonate.

The following description is of the best-contemplated mode of carrying out the invention. This description is made for the purpose of illustrating the general principles of the invention and should not be taken in a limiting sense. The scope of the invention is best determined by reference to the appended claims.

The disclosure is about a series of nitrogen-based lignins serving as a flame retardant agent. The nitrogen-based lignin is composed of a carbon source (char formation) and a nitrogen source (forming non-combustible gas) combined by an alkylene group from aldehyde. For example, the methylene bridge between the carbon source and the nitrogen source comes from formaldehyde. The carbon source is lignin such as commercially available lignosulfonate (e.g. sodium lignosulfonate, calcium lignosulfonate, ammonium lignosulfonate, or combinations thereof), alkaline lignin, organosolv lignin (e.g. rice husk lignin, rice straw lignin, bamboo lignin, camphor wood lignin, pine wood lignin, juniper wood lignin, or combinations thereof), phenol-modified lignin (e.g. phenolic lignin, catechol lignin, bisphenolic lignin, or combinations thereof), or combinations thereof. The nitrogen source can be a nitrogen-containing compound such as dicyandiamide (DICY) compound, nitrogen-containing heterocyclic compound, amide compound, or combinations thereof. The nitrogen-containing heterocyclic compound can be a triazine compound, diazole compound, or mono-nitrogen heterocycle. In one embodiment, the triazine compound can be melamine. In one embodiment, the diazole can be pyrazole, imidazole, or combinations thereof. In one embodiment, the mono-nitrogen heterocycle can be pyrrole, indole, thiazole, isothiazole, oxazole, isoxazole, benzothiazole, benzoxazole, or combinations thereof. The amide compound can be urea, thiourea, or combinations thereof. The aldehyde can be $C_{1-12}$ aldehyde or $C_{1-6}$ aldehyde. In one embodiment, the aldehyde is formaldehyde.

A nitrogen-based lignin is formed by reacting 1 part by weight of lignin, 0.8 to 2.4 parts by weight of a nitrogen-containing compound, and 0.3 to 0.9 parts by weight of an aldehyde under an alkaline condition. An extremely high amount of the nitrogen-containing compound may result in too much of the nitrogen-containing compound being un-reacted following reaction. An extremely low amount of the nitrogen-containing compound may result in insufficient reactivity, such that the flame retardant properties of products may be influenced. An extremely high amount of the aldehyde may result in an over-reaction with the lignin, thereby reducing the reactive points of the lignin. An extremely low amount of the aldehyde may result in too much of the nitrogen-containing compound being un-reacted following reaction, thereby influencing the flame retardant properties of products. In one embodiment, the alkaline condition of the reaction is ph 8-11. The aldehyde may be self-reacted by a Cannizzaro reaction under an extremely high pH value, such that the aldehyde concentration in a solution will be reduced. It is difficult for the original lignin to be dissolved and react with the aldehyde under an extremely low pH value. In one embodiment, the reaction is performed at a temperature of about 70° C. to 90° C. for a period of about 3 hours to 4 hours. An extremely high reaction temperature may result in volatilization of the aldehyde, which reduces the aldehyde concentration in a solution. An extremely low reaction temperature and/or an extremely short reaction period may cause incomplete reactions.

In one embodiment, lignin, melamine, and formaldehyde are reacted as shown in Formula 1.

(Formula 1)

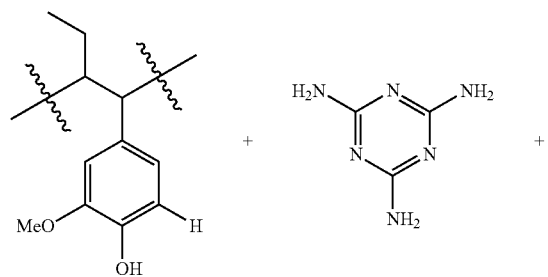

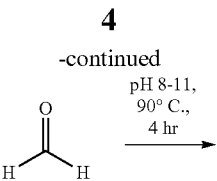

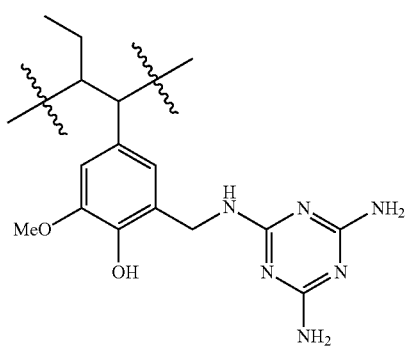

In another embodiment, 1 part by weight of lignin, 0.8 to 2.4 parts by weight of a nitrogen-containing compound, and 0.3 to 0.9 parts by weight of an aldehyde are reacted under an alkaline condition, and then added 0.8 to 2.4 parts by weight of acid to react and form a nitrogen-based lignin. The acid can be an organic acid such as cyanuric acid, or inorganic acid such as boric acid or phosphoric acid. In one embodiment, the acid amount is similar to the nitrogen-containing compound amount. An extremely high amount of the acid may dramatically reduce the pH value of a solution, such that the lignin is precipitated to reduce its reactivity. An extremely low amount of the acid may not further enhance the flame retardant properties of a product. After the acid is added to a solution, a reaction should be performed at a temperature of 95° C. to 100° C. for a period of 2 hours to 3 hours. An extremely low reaction temperature and/or an extremely short reaction period may cause an incomplete reaction.

In one embodiment, lignin, melamine, formaldehyde, and cyanuric acid are reacted as shown in Formula 2. The dotted lines in Formula 2 are hydrogen bondings.

(Formula 2)

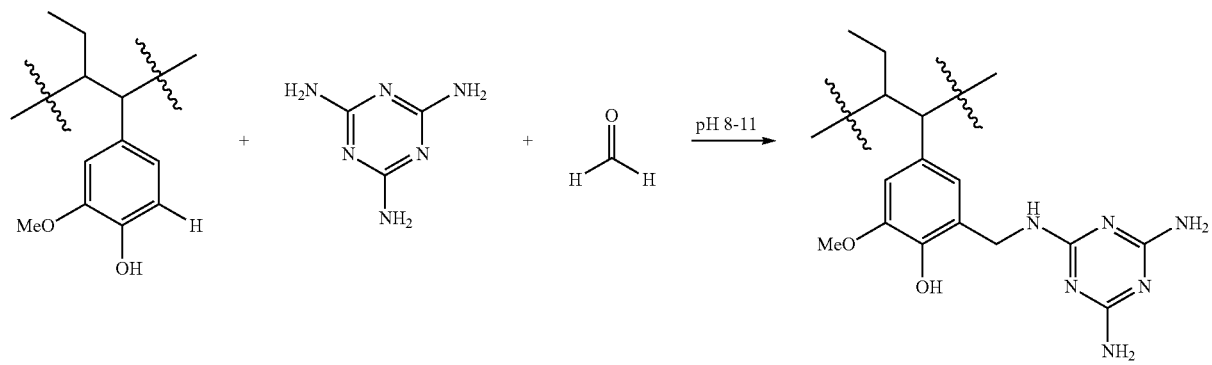

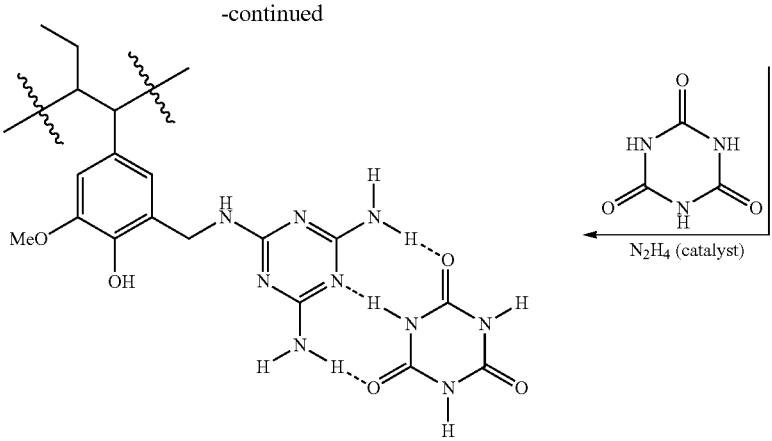

In one embodiment, lignin, melamine, formaldehyde, and boric acid are reacted as shown in Formula 3. The dotted lines in Formula 3 are hydrogen bondings.

(Formula 3)

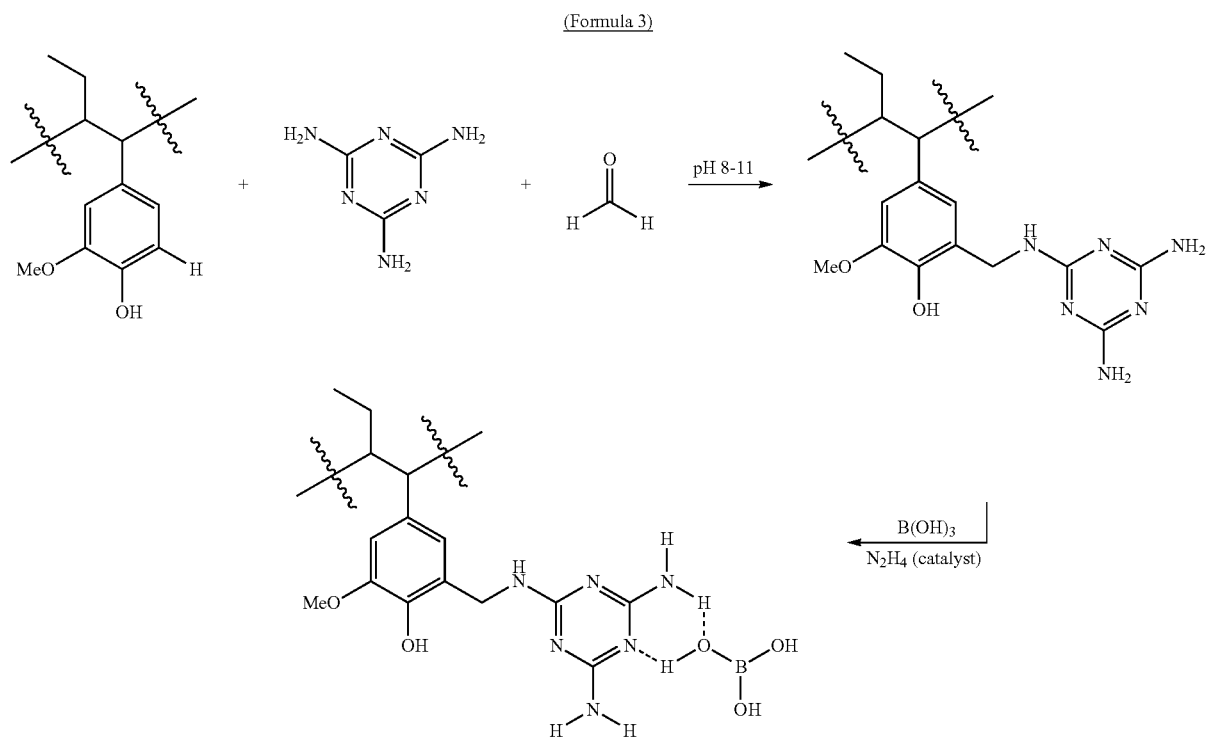

The nitrogen-based lignin may serve as the so-called flame retardant agent. The flame retardant agent can be added to a thermoplastic resin for blending, thereby efficiently enhancing the flame retardant properties of a product. The thermoplastic resin can be polyamide. The nitrogen-based lignin and the thermoplastic resin have a weight ratio of 1:10 to 1:3. The blending process cannot be achieved if the solid content caused from an extremely high amount of the nitrogen-based lignin is too high. An extremely low amount of the nitrogen-based lignin will reduce the flame retardant effects of a product. In one embodiment, the nitrogen-based lignin and the thermoplastic resin have a weight ratio of greater than 1:4, and a product may achieve a flame retardant property of V0 under the UL-94 standard without adding any other commercially available flame retardant agent.

In another embodiment, the nitrogen-based lignin not only serves as a flame retardant agent, but also serves as a curing agent of a thermosetting resin. The thermosetting resin can be epoxy resin. The functional groups such as hydroxyl and amino groups of the nitrogen-based lignin may be further reacted with the epoxy groups of the epoxy resin, such that the epoxy resin is crosslinked and cured. The nitrogen-based lignin and the thermosetting resin have a weight ratio of 1:10 to 1:1. The reaction cannot be processed if the solid content caused from an extremely high amount of the nitrogen-based lignin it too high. An extremely low amount of the nitrogen-based lignin will reduce the flame retardant effects of a product. In one embodiment, the nitrogen-based lignin may collocate with other commercially available curing agents, thereby reducing the required amount of the nitrogen-based lignin. In one embodiment, the thermosetting resin is cured by other commercial available curing agents, and the nitrogen-based lignin mainly serves as the flame retardant agent. When a commercially available curing agent is adopted, a product may achieve a flame retardant property of V1 under the UL-94 standard when the nitrogen-based lignin and the thermosetting resin have a weight ratio of greater than 1:10. Alternatively, the nitrogen-based lignin simultaneously serves as the flame retardant agent and the curing agent when no other commercially available curing agent is adopted. In this case, the amount of the nitrogen-based lignin should be higher. When no commercially available curing agent is adopted, a product may achieve a flame retardant property of V0 under the UL-94 standard when the nitrogen-based lignin and the thermosetting resin have a weight ratio of greater than 1:1.

EXAMPLES

Experiment 1

Lignin with an appropriate weight ratio was charged in a two-neck bottle, and then dissolved by an alkaline aqueous solution with a pH of 8-11. The lignin solution was heated to 70° C., and a nitrogen-containing compound was added to the lignin solution to continuously stir for 5 to 10 minutes, and formaldehyde was then added thereto. The solution was heated to 90° C. to further react for 4 hours. Afterward, the reaction result was filtered to remove the un-reacted lignin and nitrogen-containing compound. The filtered cake was washed by water and a common solvent, such as acetone, to obtain a nitrogen-based lignin with low solubility. Note that the starting materials such as lignin and the nitrogen-containing compound can be dissolved by the common solvent and hot water individually. The above phenomenon reveals that the product might be a compound from the reaction of forming chemical bondings between the starting materials, rather than a mixture of the starting materials.

Experiment 2

Lignin with an appropriate weight ratio was charged in a two-neck bottle, and then dissolved by an alkaline aqueous solution with a pH of 8-11. The lignin solution was heated to 70° C., and a nitrogen-containing compound was added to the lignin solution to continuously stir for 5 to 10 minutes, and formaldehyde was then added thereto. The solution was heated to 90° C. to further react for 4 hours. Acid and catalyst (e.g. hydrazine, $N_2H_4$) were added to the solution, and the solution was heated to 95-100° C. to react for another 1 hour. Afterward, the reaction result was filtered to remove the un-reacted lignin, nitrogen-containing compound, and acid. The filtered cake was washed by water and a common solvent, such as acetone, to obtain a nitrogen-based lignin. Note that the starting materials such as the lignin, the nitrogen-containing compound, and the acid can be dissolved by hot water or the common solvent. The product might be a compound from the reaction of forming chemical bondings between the starting materials, rather than a mixture of the starting materials.

Example 1

Figure 2:
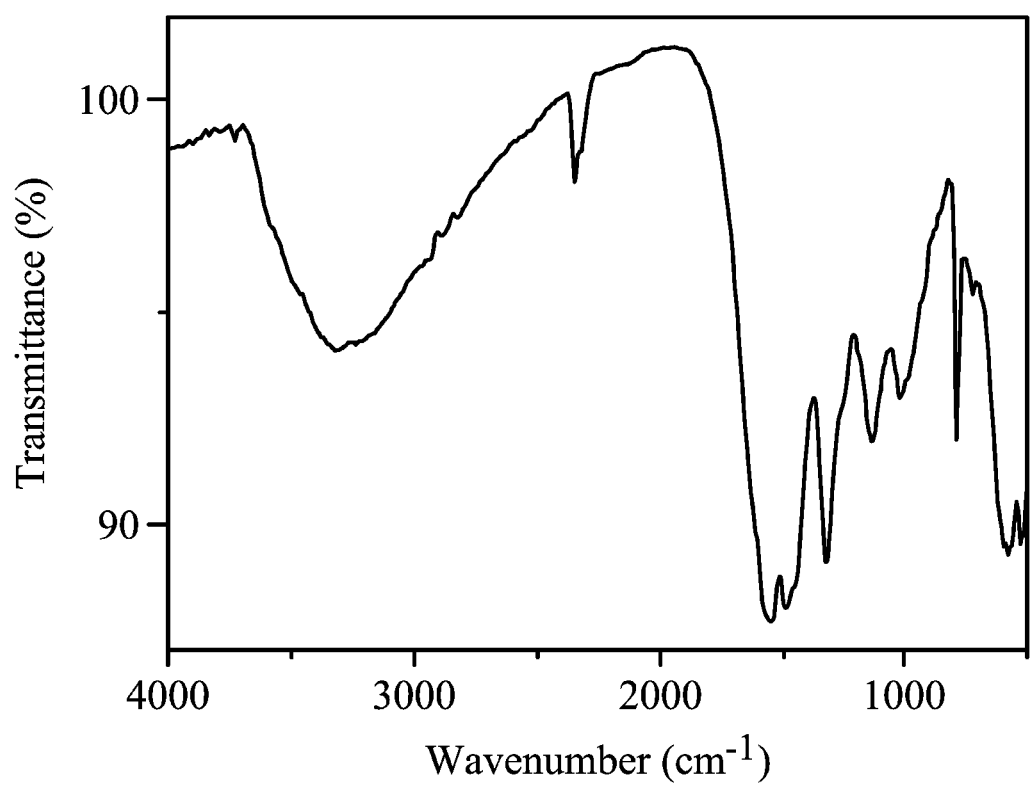
FIG. 2 shows an IR spectrum of sodium lignosulfonate-melamine of one example in the disclosure.

A constant parts by weight of sodium lignosulfonate and different parts by weight of melamine and formaldehyde were reacted as in Experiment 1, and the nitrogen contents of the nitrogen-based lignin Products 1-2 were determined by element analysis (EA) as shown in Table 1. Table 1 shows that the product has higher nitrogen content when the sodium lignosulfonate, melamine, and formaldehyde had a ratio of parts by weight of 1:1.6:0.6. The sodium lignosulfonate was DP-651 commercially available from the Borregaard Company. FIG. 1 shows an IR spectrum of the sodium lignosulfonate, and FIG. 2 shows an IR spectrum of Product 2.

TABLE 1

|  | Lignin type | Melamine amount | Formaldehyde amount | Nitrogen content of product |
| --- | --- | --- | --- | --- |
| Product 1 | Sodium lignosulfonate (1 part by weight) | 0.8 parts by weight | 0.3 parts by weight | 35.867% |
| Product 2 |  | 1.6 parts by weight | 0.6 parts by weight | 45.075% |

Example 2

Figure 3:
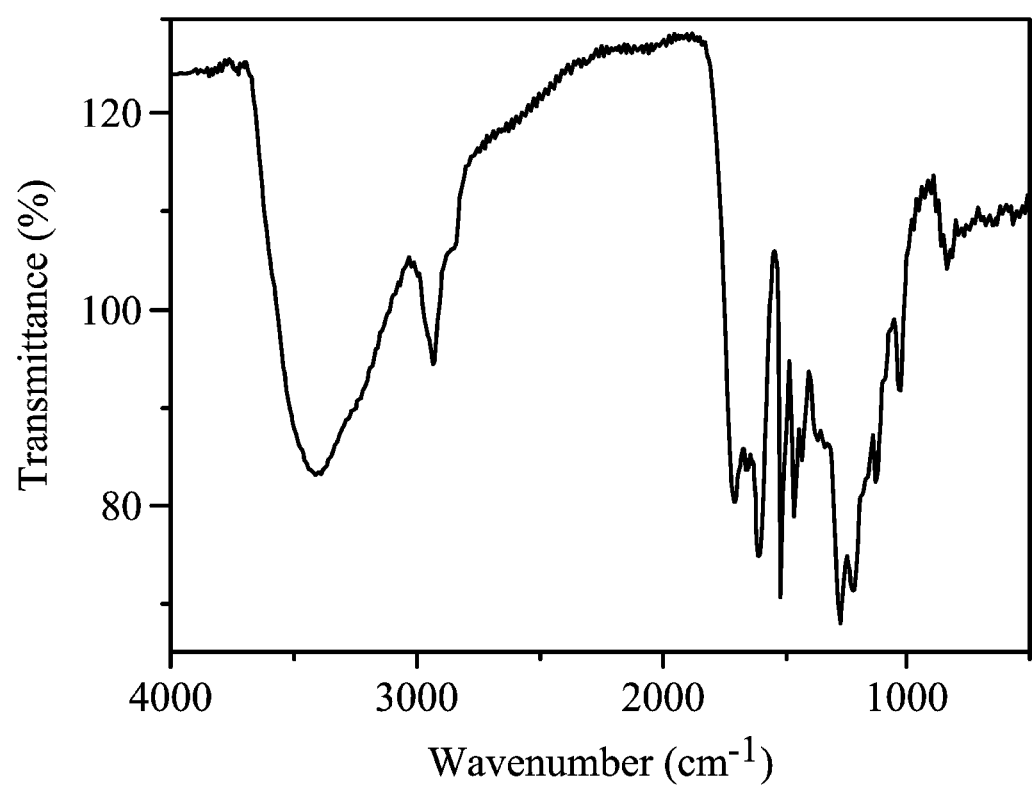
FIG. 3 shows an IR spectrum of the prepared organosolv rice husk lignin.
Figure 4:
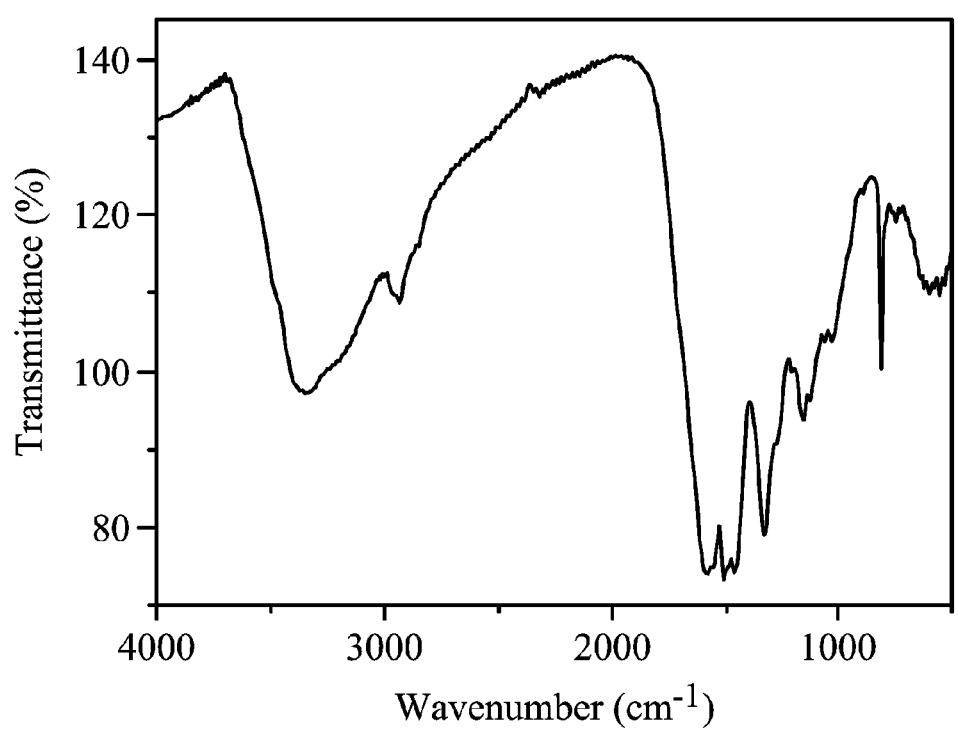
FIG. 4 shows an IR spectrum of the organosolv rice husk lignin-melamine of one example in the disclosure.

A constant parts by weight of organosolv rice husk lignin and different parts by weight of melamine and formaldehyde were reacted as in Experiment 1, and the nitrogen contents of the nitrogen-based lignin Products 3-5 were determined by element analysis (EA) as shown in Table 2. Table 2 shows that the product had higher nitrogen content when the organosolv rice husk lignin, melamine, and formaldehyde had a ratio of parts by weight of 1:1.6:0.6. The organosolv rice husk lignin was extracted by a Lab T100 from the Material and Chemical Research Laboratories of the ITRI. FIG. 3 shows an IR spectrum of the organosolv rice husk lignin, and FIG. 4 shows an IR spectrum of the Product 4.

TABLE 2

|  | Lignin type | Melamine amount | Formaldehyde amount | Nitrogen content of product |
| --- | --- | --- | --- | --- |
| Product 3 | Organosolv rice husk lignin (1 part by weight) | 0.8 parts by weight | 0.3 parts by weight | 25.552% |
| Product 4 |  | 1.6 parts by weight | 0.6 parts by weight | 43.094% |
| Product 5 |  | 2.4 parts by weight | 0.9 parts by weight | 42.418% |

Example 3

Figure 5:
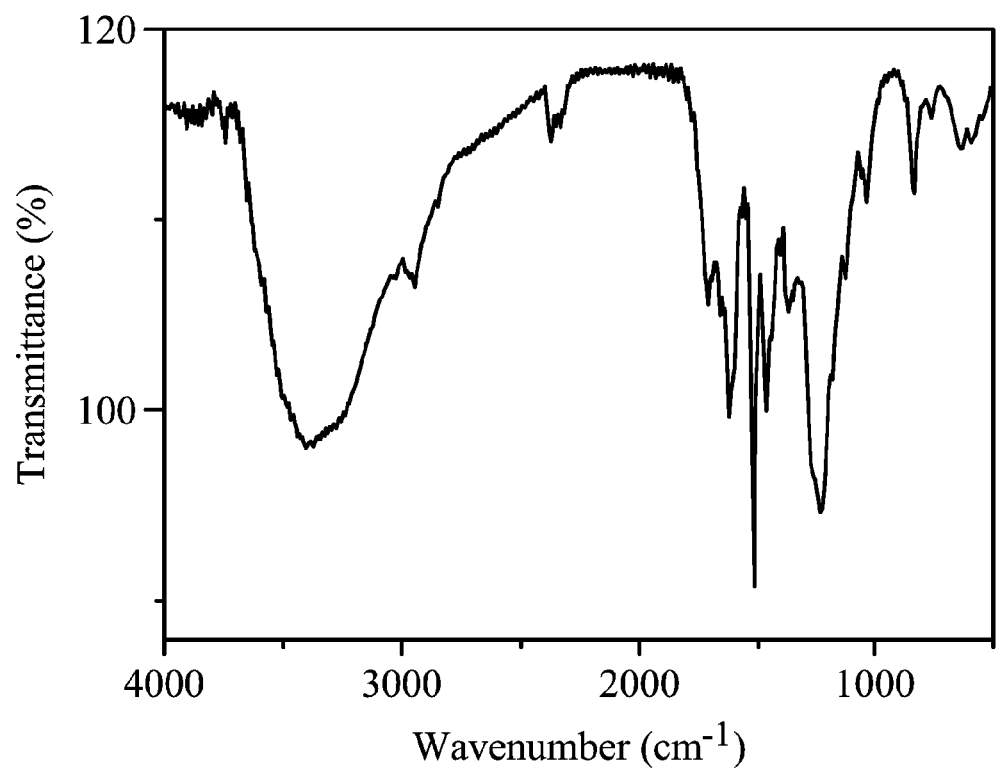
FIG. 5 shows an IR spectrum of a prepared phenolic lignin.
Figure 6:
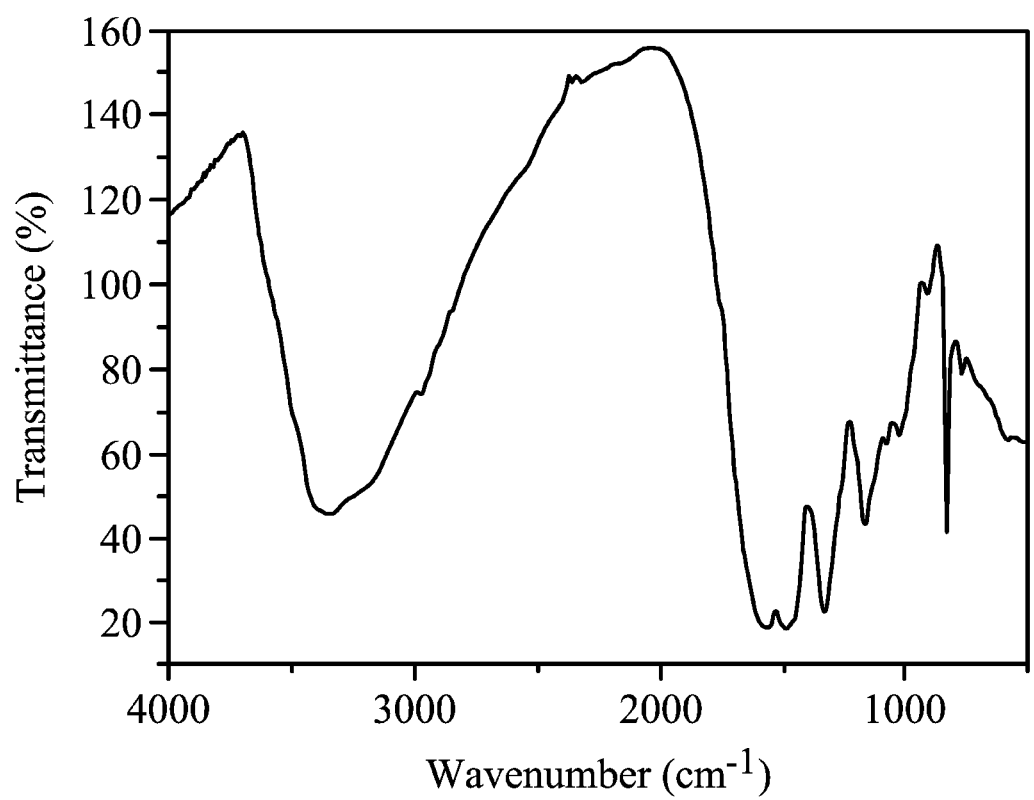
FIG. 6 shows an IR spectrum of the phenolic lignin-melamine of one example in the disclosure.

A constant parts by weight of phenolic lignin and different parts by weight of melamine and formaldehyde were reacted as in Experiment 1, and nitrogen contents of the nitrogen-based lignin Products 6-7 were determined by element analysis (EA) as shown in Table 3. Table 3 shows that the product had higher nitrogen content when the phenolic lignin, melamine, and formaldehyde had a ratio of parts by weight of 1:1.6:0.6. The phenolic lignin was prepared by phenolization of the organosolv lignin which was extracted by a Lab T100 from the Material and Chemical Research Laboratories of the ITRI. FIG. 5 shows an IR spectrum of the phenolic lignin, and FIG. 6 shows an IR spectrum of a Product 7.

TABLE 3

| | Lignin type | Melamine amount | Formaldehyde amount | Nitrogen content of product |
|---|---|---|---|---|
| Product 6 | Phenolic lignin (1 part by weight) | 0.8 parts by weight | 0.3 parts by weight | 33.106% |
| Product 7 | | 1.6 parts by weight | 0.6 parts by weight | 40.098% |

Example 4

Figure 7:
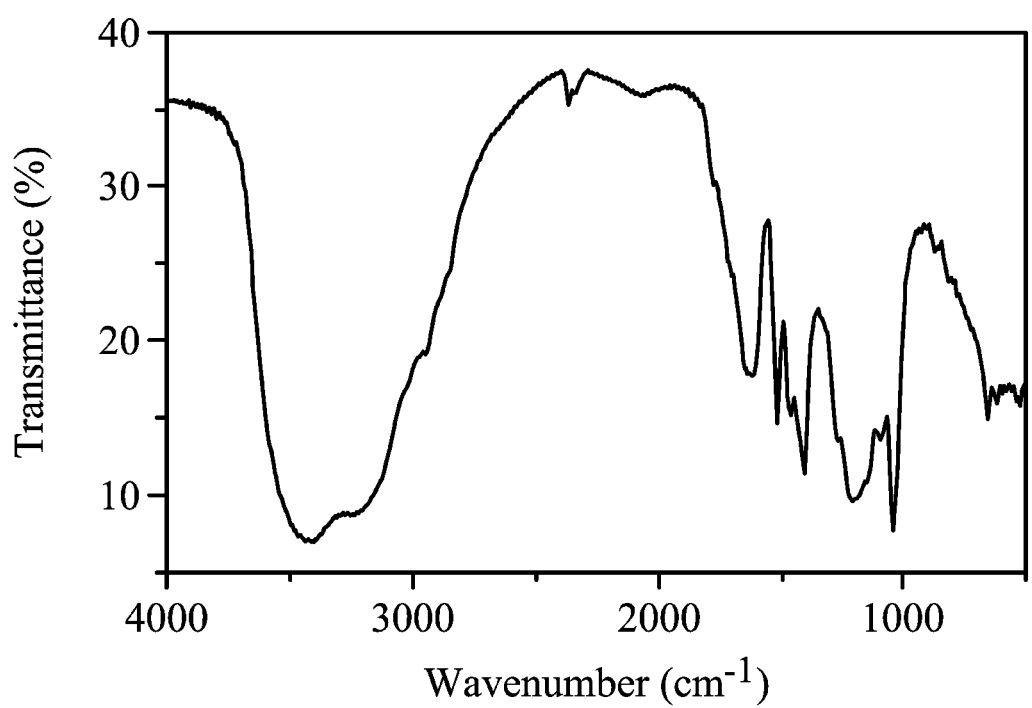
FIG. 7 shows an IR spectrum of a commercially available ammonium lignosulfonate.
Figure 8:
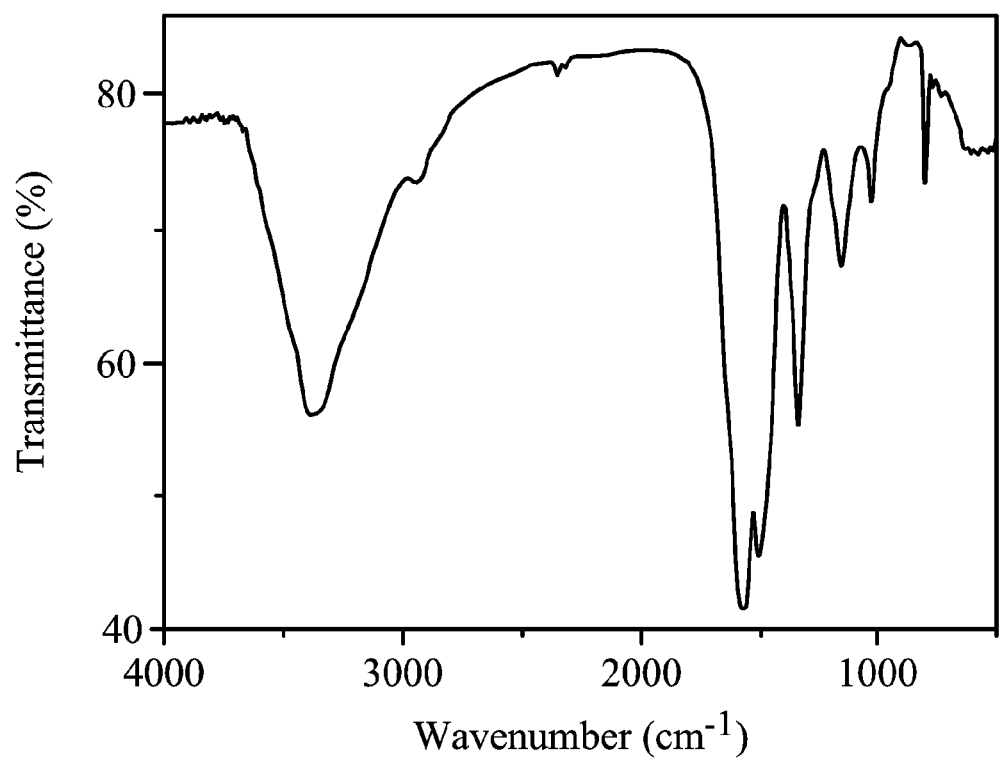
FIG. 8 shows an IR spectrum of the ammonium lignosulfonate-melamine of one example in the disclosure.
Figure 9:
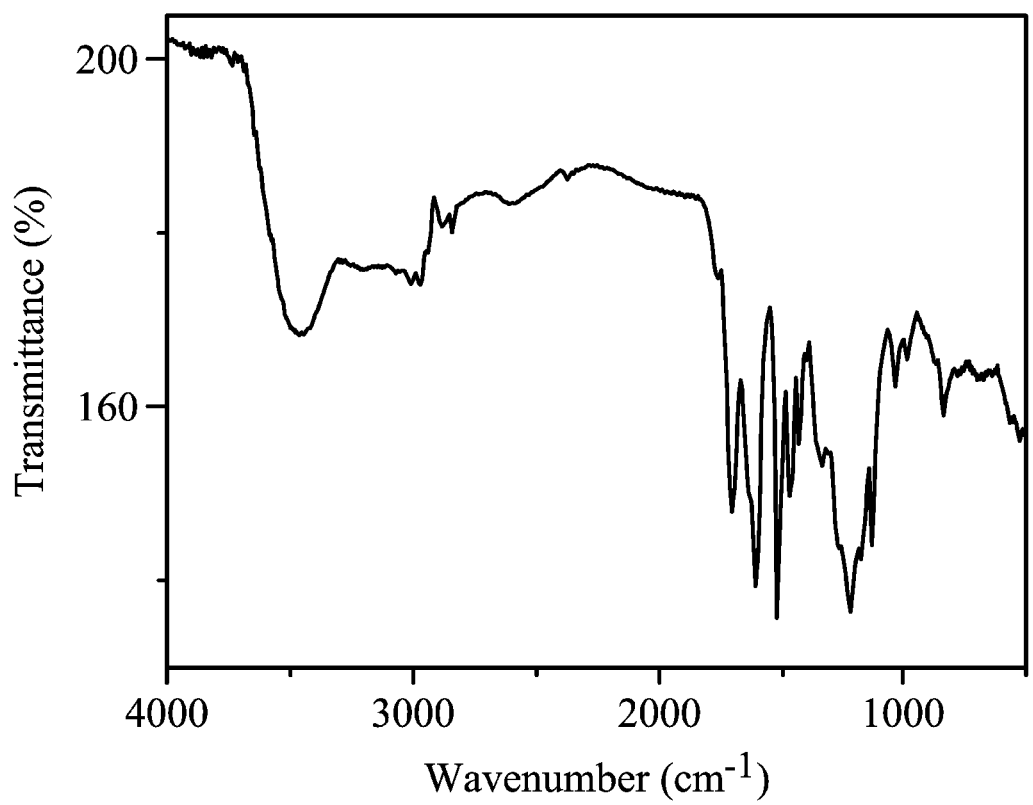
FIG. 9 shows an IR spectrum of a commercially available alkaline lignin.
Figure 10:
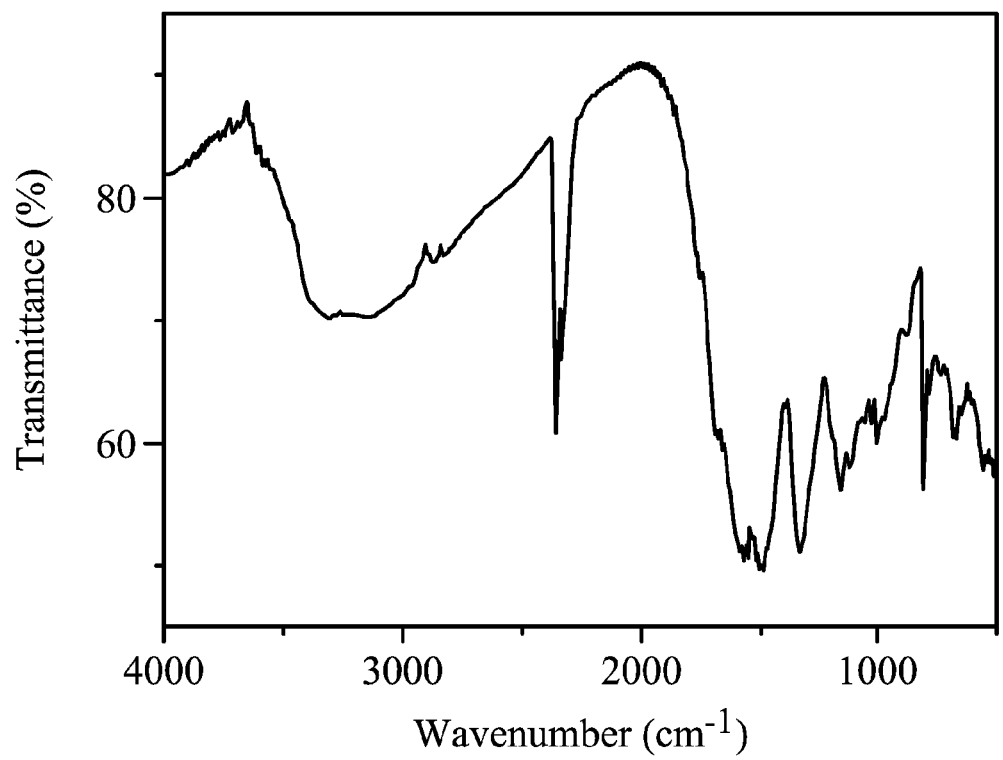
FIG. 10 shows an IR spectrum of the alkaline lignin-melamine of one example in the disclosure.
Figure 11:
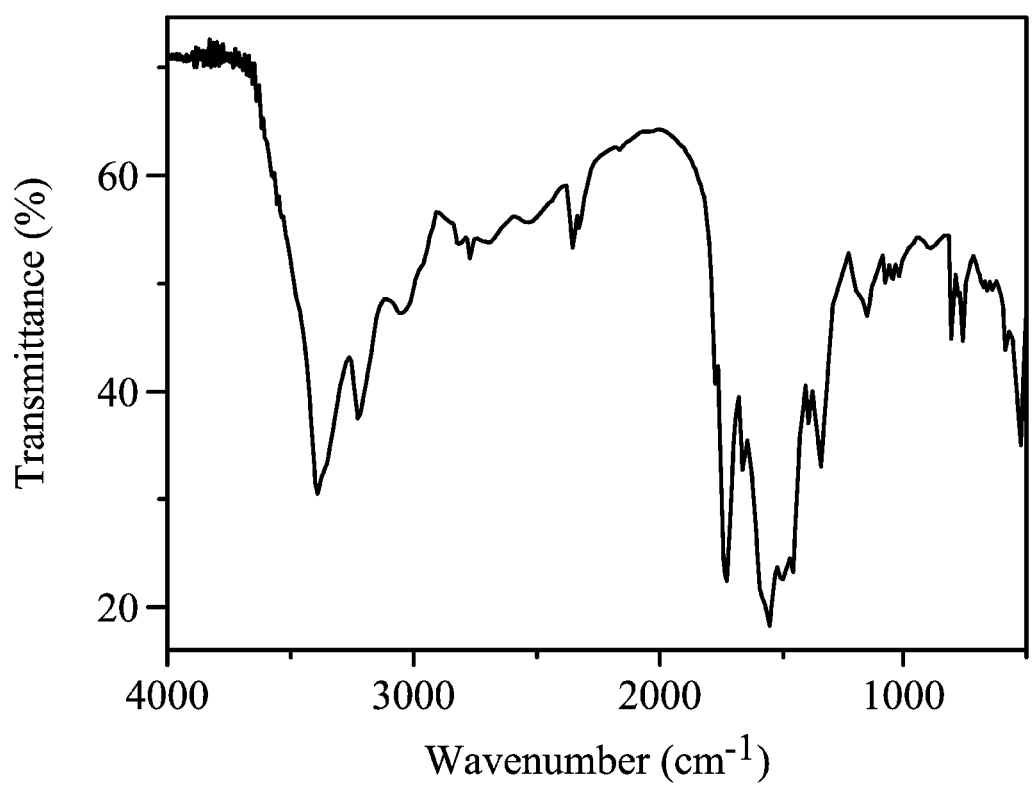
FIG. 11 shows an IR spectrum of the organosolv rice husk lignin-melamine/cyanuric acid of one example in the disclosure.
Figure 12:
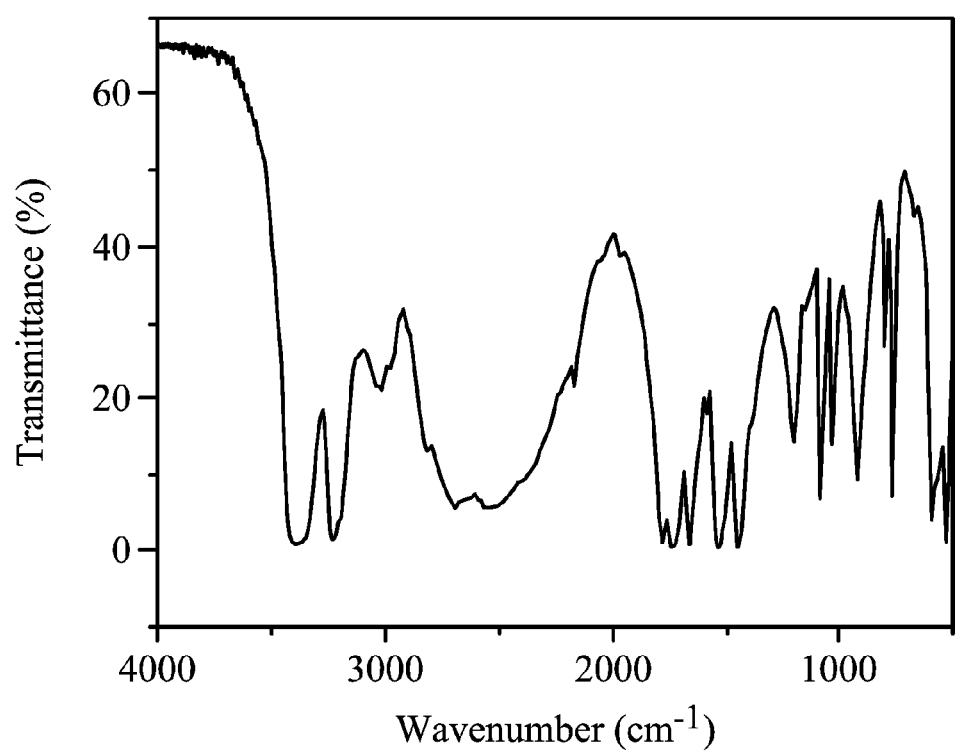
FIG. 12 shows an IR spectrum of the sodium lignosulfonate-melamine/cyanuric acid of one example in the disclosure.
Figure 13:
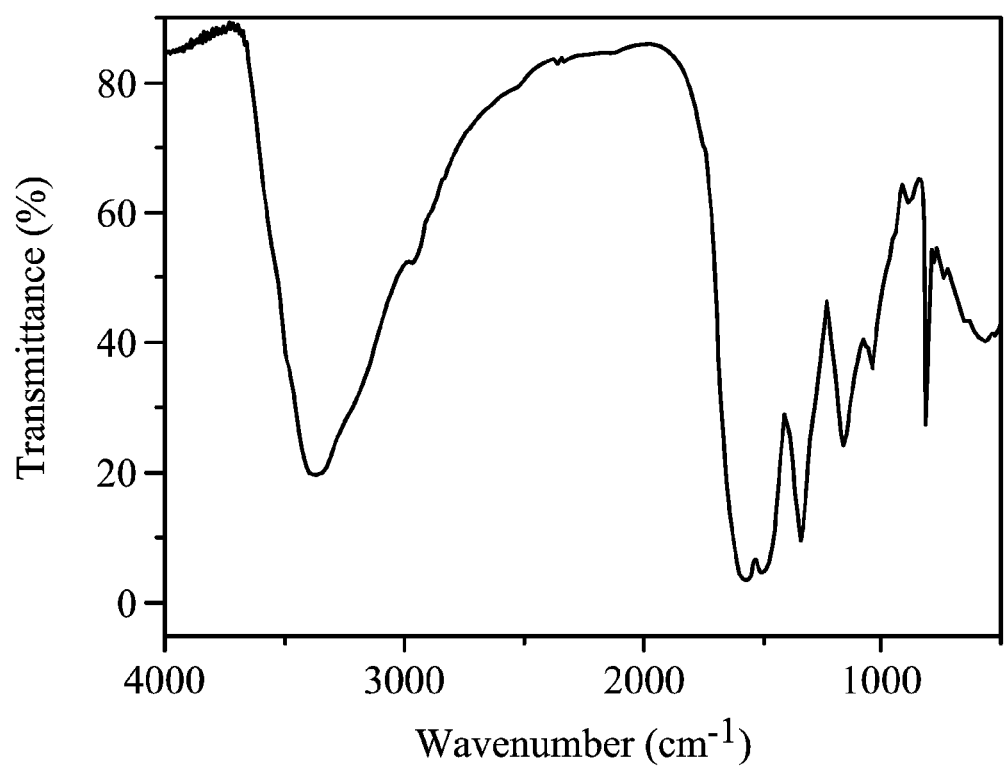
FIG. 13 shows an IR spectrum of the sodium lignosulfonate-melamine/boric acid of one example in the disclosure.
Figure 14:
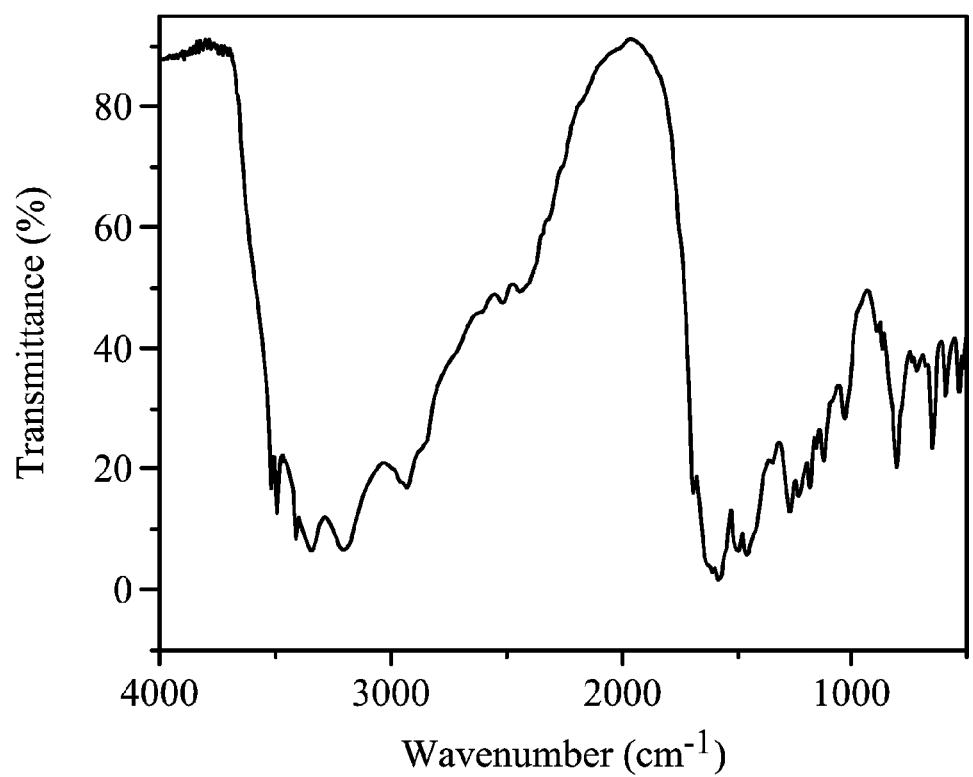
FIG. 14 shows an IR spectrum of the organosolv rice husk lignin-melamine/boric acid of one example in the disclosure.
Figure 15:
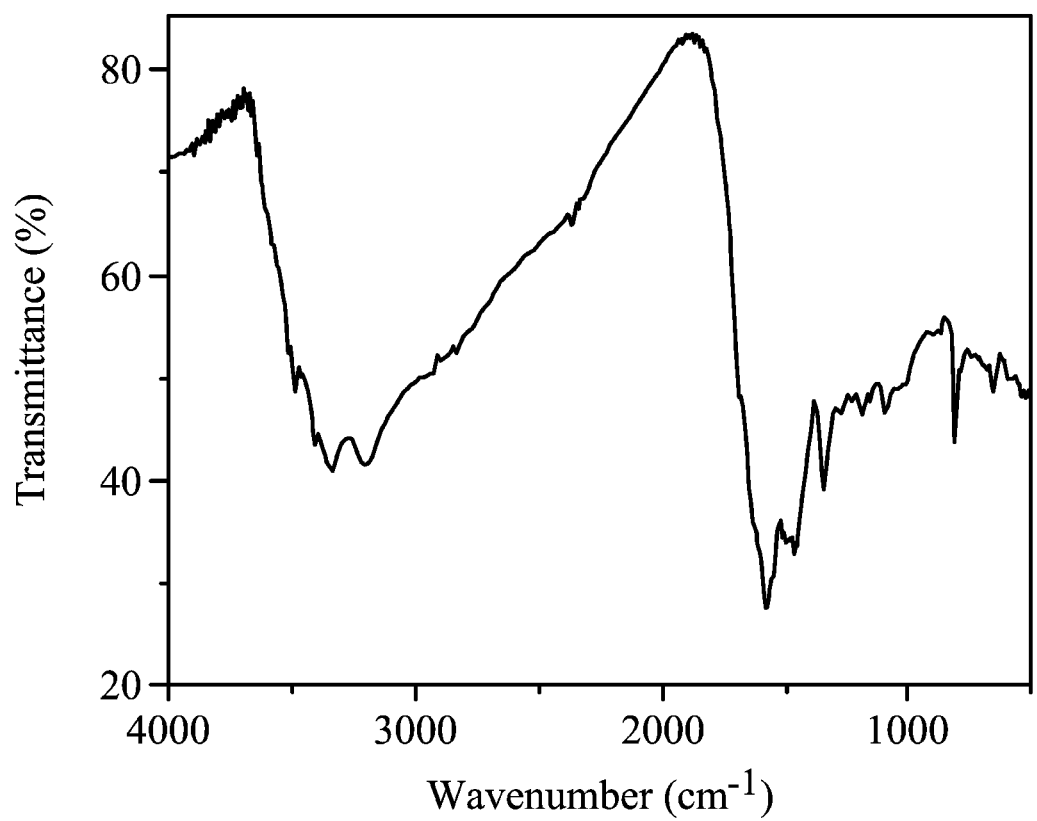
FIG. 15 shows an IR spectrum of the phenolic lignin-melamine/boric acid of one example in the disclosure.
Figure 16:
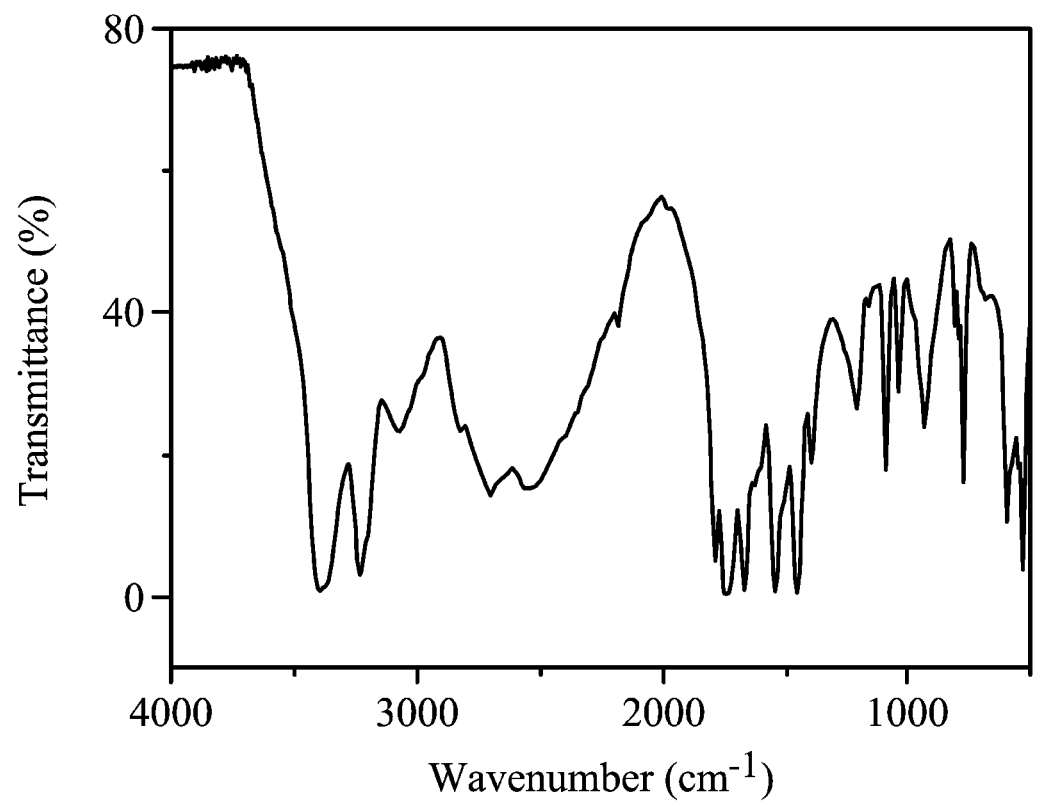
FIG. 16 shows an IR spectrum of the phenolic lignin-melamine/cyanuric acid of one example in the disclosure.

Ammonium lignosulfonate and alkaline lignin were reacted with melamine and formaldehyde as Experiment 1, respectively, and nitrogen contents of the nitrogen-based lignin Products 8-9 were determined by element analysis (EA) as shown in Table 4. Furthermore, organosolv rice husk lignin, melamine, formaldehyde, and cyanuric acid were reacted as in Experiment 2, and a nitrogen content of the nitrogen-based lignin Product 10 was determined by element analysis (EA) as shown in Table 4. The ammonium lignosulfonate was AM-320 commercially available from the Borregaard Company. FIG. 7 shows an IR spectrum of the ammonium lignosulfonate, and FIG. 8 shows an IR spectrum of the Product 8. The alkaline lignin was BS-F commercially available from the Bonegaard Company. FIG. 9 shows an IR spectrum of the alkaline lignin, FIG. 10 shows an IR spectrum of the Product 9, and FIG. 11 shows an IR spectrum of the Product 10.

TABLE 4

| | Lignin type | Nitrogen source | Acid | Formaldehyde amount | Nitrogen content of product |
|---|---|---|---|---|---|
| Product 8 | Ammonium lignosulfonate (1 part by weight) | Melamine (1.6 parts by weight) | None | 0.6 parts by weight | 35.867% |
| Product 9 | Alkaline lignin (1 part by weight) | Melamine (1.6 parts by weight) | None | 0.6 parts by weight | 33.625% |
| Product 10 | Organosolv rice husk lignin (1 part by weight) | Melamine (1.6 parts by weight) | Cyanuric acid (1.6 parts by weight) | 0.6 parts by weight | 34.092% |

Example 5

Sodium lignosulfonate, melamine, formaldehyde, and cyanuric acid were reacted as in Experiment 2 to obtain a nitrogen-based lignin (Product 11). Sodium lignosulfonate, melamine, formaldehyde, and boric acid were reacted as in Experiment 2 to obtain a nitrogen-based lignin (Product 12). Organosolv rice husk lignin, melamine, formaldehyde, and boric acid were reacted as in Experiment 2 to obtain a nitrogen-based lignin (Product 13). Phenolic lignin, melamine, formaldehyde, and boric acid were reacted as in Experiment 2 to obtain a nitrogen-based lignin (Product 14). Phenolic lignin, melamine, formaldehyde, and cyanuric acid were reacted as in Experiment 2 to obtain a nitrogen-based lignin (Product 15). FIGS. 12-16 show IR spectra of Products 11-15.

TABLE 5

| | Lignin type | Nitrogen source | Acid | Formaldehyde amount |
|---|---|---|---|---|
| Product 11 | Sodium lignosulfonate (1 part by weight) | Melamine (1.6 parts by weight) | Cyanuric acid (1.6 parts by weight) | 0.6 parts by weight |
| Product 12 | Sodium lignosulfonate (1 part by weight) | Melamine (1.6 parts by weight) | Boric acid (1.6 parts by weight) | 0.6 parts by weight |
| Product 13 | Organosolv rice husk lignin (1 part by weight) | Melamine (1.6 parts by weight) | Boric acid (1.6 parts by weight) | 0.6 parts by weight |
| Product 14 | Phenolic lignin (1 part by weight) | Melamine (1.6 parts by weight) | Boric acid (1.6 parts by weight) | 0.6 parts by weight |
| Product 15 | Phenolic lignin (1 part by weight) | Melamine (1.6 parts by weight) | Cyanuric acid (1.6 parts by weight) | 0.6 parts by weight |

Example 6

An original organosolv rice husk lignin and modified organosolv rice husk lignin such as Product 4, serving as curing agents and flame retardant agents, were added to an epoxy resin for curing reactions, respectively. The epoxy resin used was EPDXY-128E commercially available from the Nanya Company. The flame retardant properties of the cured Products 16-18 were determined by the UL-94 standard and tabulated, as shown in Table 6. According to Product 16, the flame retardant properties of the epoxy resin were not enhanced by adding the original organosolv rice husk lignin. According to Product 17, the original organosolv rice husk lignin and the melamine were directly mixed and then added to the epoxy resin, but the flame retardant properties of the epoxy resin was not enhanced by adding the mixture. According to Product 18, the nitrogen-based lignin formed by reacting the organosolv rice husk lignin, melamine, and formaldehyde together, can be added to the epoxy resin to efficiently enhance the flame retardant properties of a product.

TABLE 6

| | Nitrogen-based lignin | Additive amount (wt %) | Melamine additive amount (wt %) | UL-94 result |
|---|---|---|---|---|
| Product 16 | Organosolv rice husk lignin | 50 | 0 | Fail |
| Product 17 | Organosolv rice husk lignin | 20 | 30 | Fail |
| Product 18 | Organosolv rice husk lignin-melamine (product 4) | 50 | 0 | V0 |

Example 7

Modified lignins such as Products 4, 2, 9, 7, 10, and 15, serving as curing agents and flame retardant agents, were added to an epoxy resin for curing reactions, respectively. The epoxy resin used was EPDXY-128E commercially available from the Nanya Company. The flame retardant properties of the cured Products 18-23 were determined by the UL-94 standard and tabulated, as shown in Table 7. According to Products 18-21, the nitrogen-based lignin formed by reacting the lignin, melamine, and formaldehyde together, can be added to the epoxy resin to efficiently enhance the flame retardant properties of a product. According to Products 22-23, the nitrogen-based lignin formed by reacting the lignin, melamine, formaldehyde, and cyanuric acid together, can be added to the epoxy resin to efficiently enhance the flame retardant properties of a product.

TABLE 7

| | Nitrogen-based lignin | Additive amount (wt %) | UL-94 result |
|---|---|---|---|
| Product 18 | Organosolv rice husk lignin-melamine (product 4) | 50 | V0 |
| Product 19 | Sodium lignosulfonate-melamine (Product 2) | 50 | V0 |
| Product 20 | Alkaline lignin-melamine (Product 9) | 50 | V0 |
| Product 21 | Phenolic lignin-melamine (Product 7) | 50 | V1 |
| Product 22 | Organosolv rice husk lignin-melamine/cyanuric acid (Product 10) | 50 | V0 |
| Product 23 | Phenolic lignin-melamine/cyanuric acid (Product 15) | 50 | V0 |

Example 8

An original organosolv rice husk lignin and modified lignins such as Products 4, 2, and 7, serving as curing agents and flame retardant agents, were added to an epoxy resin for curing reactions, respectively. The epoxy resin used was EPDXY-128E commercially available from the Nanya Company. In addition, different parts by weight of flame retardant agents KFR-DOPO (commercially available from Kuo Ching Chemical Co., Ltd, Taiwan) were added to Products 24-28, respectively. The flame retardant properties of the cured Products 24-28 were determined by the UL-94 standard and tabulated, as shown in Table 8. According to Product 24, the flame retardant properties of a product cannot be enhanced by adding the DOPO and the original lignin. According to Products 25-28, the nitrogen-based lignin formed by reacting the lignin, melamine, and formaldehyde together, can be added to the epoxy resin to efficiently enhance the flame retardant properties of a product. According to Products 26-28, the epoxy resin with the nitrogen-based lignin only needs additive lower amount of the DOPO to achieve the same flame retardant properties as in product 25.

TABLE 8

| | Nitrogen-based lignin | Additive amount (wt %) | DOPO additive amount (wt %) | UL-94 result |
|---|---|---|---|---|
| Product 24 | Organosolv rice husk lignin | 40 | 15 | Fail |
| Product 25 | Organosolv rice husk lignin-melamine (product 4) | 30 | | V0 |
| Product 26 | Organosolv rice husk lignin-melamine (product 4) | 40 | 4 | V0 |
| Product 27 | Sodium lignosulfonate-melamine (Product 2) | 40 | | V1 |
| Product 28 | Phenolic lignin-melamine (Product 7) | 40 | | V1 |

Example 9

An original organosolv rice husk lignin and modified lignins such as Products 7, 15, 13, 14, 11, and 10, serving as curing agents and flame retardant agents, were added to an epoxy resin for curing reactions, respectively. The epoxy resin used was EPDXY-128E commercially available from the Nanya Company. In addition, the curing agents DADPM (158040010, commercially available from ACROS) were added to Products 29-36, respectively. The flame retardant properties of the cured Products 29-36 were determined by the UL-94 standard and tabulated, as shown in Table 9. According to Product 29, the flame retardant properties of a product cannot be enhanced by adding the original organosolv rice husk lignin. According to Products 30 and 35, the nitrogen-based lignin formed by reacting the lignin, melamine, and formaldehyde together, can be added to the epoxy resin to efficiently enhance the flame retardant properties of a product. According to Products 31-34 and 36, the nitrogen-based lignin formed by reacting the lignin, melamine, formaldehyde, and acid (e.g. boric acid or cyanuric acid) together, can be added to the epoxy resin to efficiently enhance the flame retardant properties of a product. According to Product 32, it is preferable to use the boric acid as the acid in the reaction for forming the nitrogen-based lignin than not using an acid (Product 35) or using cyanuric acid (Product 36), as Product 23 has a higher flame retardant property than Product 35 or 36.

TABLE 9

| | Nitrogen-based lignin | Additive amount (wt %) | Curing agent additive amount (wt %) | UL-94 result |
|---|---|---|---|---|
| Product 29 | Organosolv rice husk lignin | 15 | DADPM (40) | Fail |
| Product 30 | Phenolic lignin-melamine (product 7) | | | V1 |
| Product 31 | Organosolv rice husk lignin-melamine/boric acid (Product 13) | | | V1 |
| Product 32 | Phenolic lignin-melamine/boric acid (product 14) | | | V0 |
| Product 33 | Sodium lignosulfonate-melamine/cyanuric acid (Product 11) | 30 | DADPM (40) | V1 |
| Product 34 | Organosolv rice husk lignin-melamine/cyanuric acid (Product 10) | | | V0 |
| Product 35 | Phenolic lignin-melamine (product 7) | | | V1 |
| Product 36 | Phenolic lignin-melamine/cyanuric acid (Product 15) | | | V0 |

Example 10

An original organosolv rice husk lignin and modified lignins such as Products 2, 7, and 10, serving as curing agents and flame retardant agents, were added to an epoxy resin for curing reactions, respectively. The epoxy resin used was EPDXY-128E commercially available from the Nanya Company. Following, the curing agents DADPM (158040010, commercially available from ACROS) and the flame retardant agents KFR-DOPO (commercially available from Kuo Ching Chemical Co., Ltd, Taiwan) were added to Products 37-40, respectively. The flame retardant properties of the cured Products 37-40 were determined by the UL-94 standard and tabulated, as shown in Table 10. According to Product 37, the flame retardant properties of a product cannot be enhanced by adding the original organosolv rice husk lignin and the DOPO. According to Products 38-39, the nitrogen-based lignin formed by reacting the lignin, melamine, and formaldehyde together, can be added to the epoxy resin to efficiently enhance the flame retardant properties of a product. According to Product 40, the nitrogen-based lignin formed by reacting the lignin, melamine, formaldehyde, and cyanuric acid together, can be added to the epoxy resin to efficiently enhance the flame retardant properties of a product.

TABLE 10

| | Nitrogen-based lignin | Additive amount (wt %) | Curing agent additive amount (wt %) | DOPO additive amount (wt %) | UL-94 result |
|---|---|---|---|---|---|
| Product 37 | Organosolv rice husk lignin | 15 | DADPM (40) | 2 | Fail |
| Product 38 | Sodium lignosulfonate-melamine (product 2) | | | | V1 |
| Product 39 | Phenolic lignin-melamine (product 7) | | | | V0 |
| Product 40 | Organosolv rice husk lignin-melamine/cyanuric acid (product 10) | | | | V0 |

Example 11

An original organosolv rice husk lignin and modified lignins such as Products 4 and 2, serving as flame retardant agents, were added to polyamide PA66 (AT0110GN 01 commercially available from Ginar Technology Co., Ltd., Taiwan) for blending, respectively. In addition, melamine was added to Product 42. The flame retardant properties of the blended Products 41-44 were determined by the UL-94 standard and tabulated, as shown in Table 11. According to Products 41 and 42, the flame retardant properties of a product cannot be enhanced by adding the original organosolv rice husk lignin, or by even further adding melamine. According to Products 43-44, the nitrogen-based lignin formed by reacting the lignin, melamine, and formaldehyde together, can be blended with the polyamide to efficiently enhance the flame retardant properties of a product.

TABLE 11

| | Nitrogen-based lignin | Additive amount (wt %) | Melamine additive amount (wt %) | UL-94 result |
|---|---|---|---|---|
| Product 41 | Organosolv rice husk lignin | 30 | — | Fail |
| Product 42 | Organosolv rice husk lignin | 15 | 15 | Fail |
| Product 43 | Organosolv rice husk lignin-melamine (product 4) | 25 | — | V0 |
| Product 44 | Sodium lignosulfonate-melamine (product 2) | 25 | — | V0 |

Example 12

An original organosolv rice husk lignin and modified lignins such as Products 4, 2, and 7, serving as flame retardant agents, were added to polyamide PA66 (AT0110GN 01 commercially available from Ginar Technology Co., Ltd., Taiwan) for blending, respectively. In addition, a flame retardant agent MC (MELAPUR MC25, commercially available from Ciba Company) was added to Products 45-48. The flame retardant properties of the blended Products 45-48 were determined by the UL-94 standard and tabulated, as shown in Table 12. According to Product 45, the flame retardant properties of a product cannot be enhanced by adding the original organosolv rice husk lignin and MC. According to Products 46-48, the nitrogen-based lignin formed by reacting the lignin, melamine, and formaldehyde together, can be blended with the polyamide to efficiently enhance the flame retardant properties of a product.

TABLE 12

| | Nitrogen-based lignin | Additive amount (wt %) | MC additive amount (wt %) | UL-94 result |
|---|---|---|---|---|
| Product 45 | Organosolv rice husk lignin | 15 | 15 | Fail |
| Product 46 | Rice husk lignin-melamine (product 4) | 12.5 | 12.5 | V0 |
| Product 47 | Sodium lignosulfonate-melamine (product 2) | 12.5 | 12.5 | V0 |
| Product 48 | Phenolic lignin-melamine (product 7) | 20 | 5 | V0 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A flame retardant agent, comprising:
   a nitrogen-based lignin formed by reacting 1 parts by weight of lignin, 0.8 to 2.4 parts by weight of a nitrogen-containing compound, and 0.3 to 0.9 parts by weight of an aldehyde under an alkaline condition,
   wherein the nitrogen-based lignin is further reacted with 0.8 to 2.4 parts by weight of acid, wherein the acid consists of boric acid, cyanuric acid, or combinations thereof.

2. The flame retardant agent as claimed in claim 1, wherein the lignin comprises lignosulfonate, alkaline lignin, organosolv lignin, phenol-modified lignin, or combinations thereof.

3. The flame retardant agent as claimed in claim 2, wherein the organosolv lignin comprises organosolv rice husk lignin.

4. The flame retardant agent as claimed in claim 1, wherein the nitrogen-containing compound comprises a dicyandiamide compound, nitrogen-containing heterocyclic compound, amide compound, or combinations thereof.

5. The flame retardant agent as claimed in claim 4, wherein the nitrogen-containing heterocyclic compound comprises a triazine compound, diazole compound, or mono-nitrogen heterocycle.

6. The flame retardant agent as claimed in claim 5, wherein the triazine comprises melamine.

7. The flame retardant agent as claimed in claim 5, wherein the diazole comprises pyrazole, imidazole, or combinations thereof.

8. The flame retardant agent as claimed in claim 5, wherein the mono-nitrogen heterocycle comprises pyrrole, indole, thiazole, isothiazole, oxazole, isoxazole, benzothiazole, benzoxazole, or combinations thereof.

9. The flame retardant agent as claimed in claim 4, wherein the amide compound comprises urea, thiourea, or combinations thereof.

10. The flame retardant agent as claimed in claim 1, wherein the aldehyde comprises $C_{1-12}$ aldehyde.

11. A flame retardant material, comprising:
the flame retardant agent as claimed in claim 1; and
a thermosetting resin,
wherein the flame retardant agent and the thermosetting resin have a weight ratio of 1:10 to 1:1.

12. The flame retardant material as claimed in claim 11, wherein the thermosetting resin comprises epoxy resin.

13. A flame retardant material, comprising:
the flame retardant agent as claimed in claim 1; and
a thermoplastic resin,
wherein the flame retardant agent and the thermoplastic resin have a weight ratio of 1:10 to 1:3.

14. The flame retardant material as claimed in claim 13, wherein the thermoplastic resin comprises polyamide.

* * * * *